Dec. 31, 1929.    J. A. MILLIKEN    1,741,708
APPARATUS FOR BLOWING GLASS
Filed Nov. 13, 1922    12 Sheets-Sheet 12
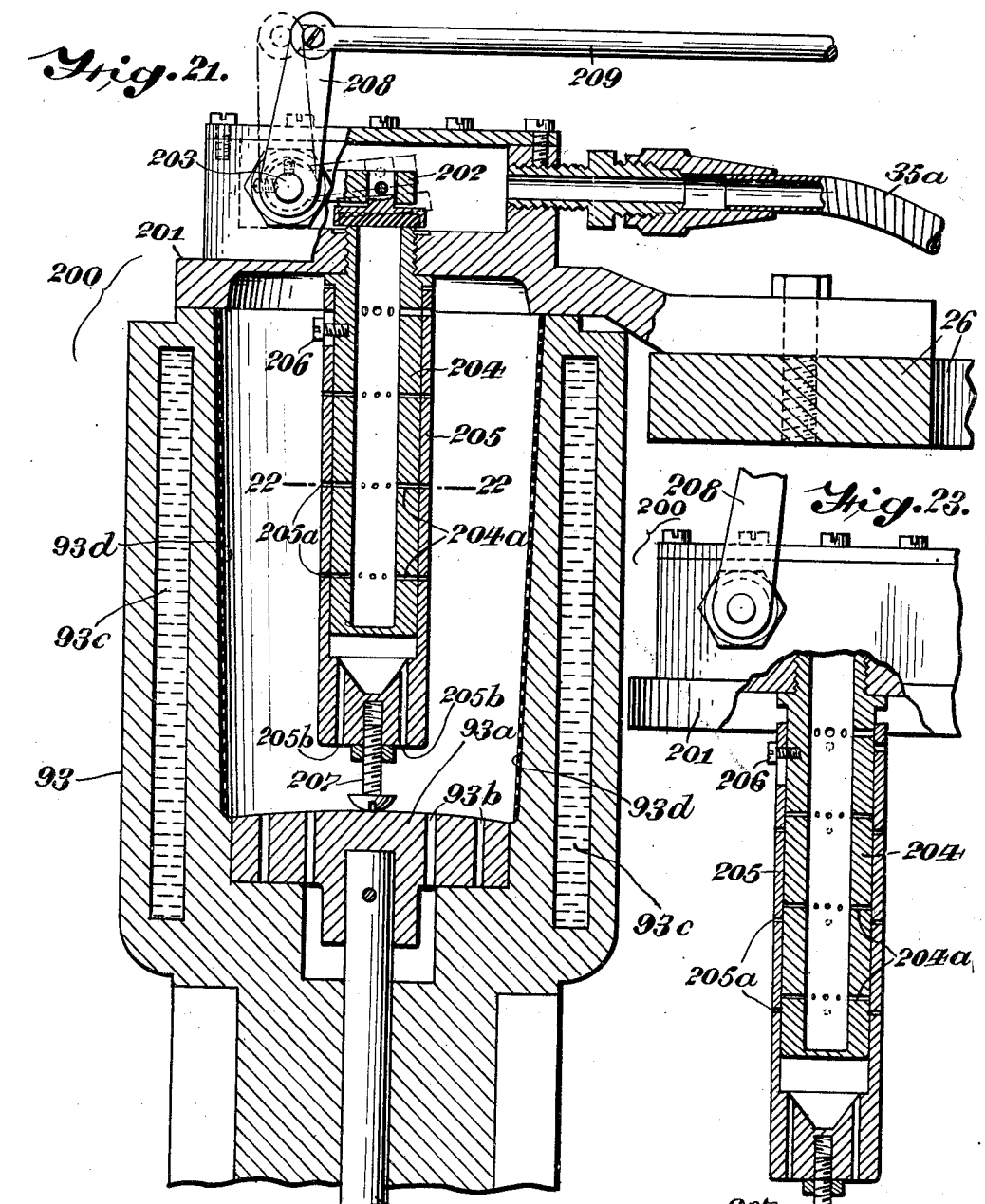
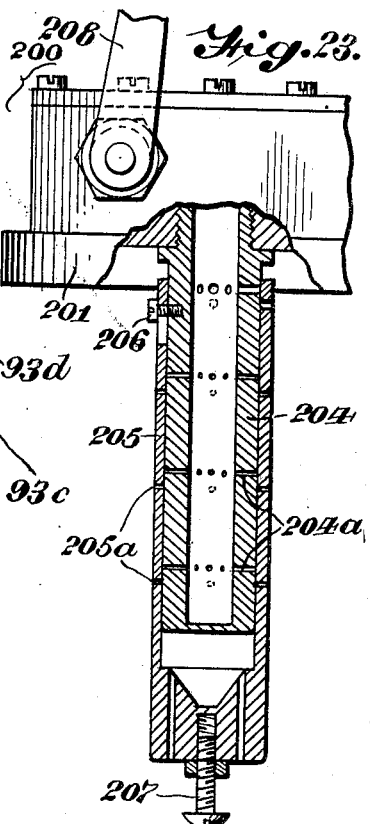
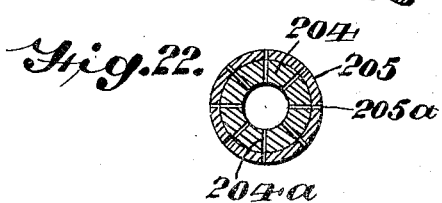
INVENTOR.
John A. Milliken
BY Cornelius D. Ehret
his ATTORNEY.

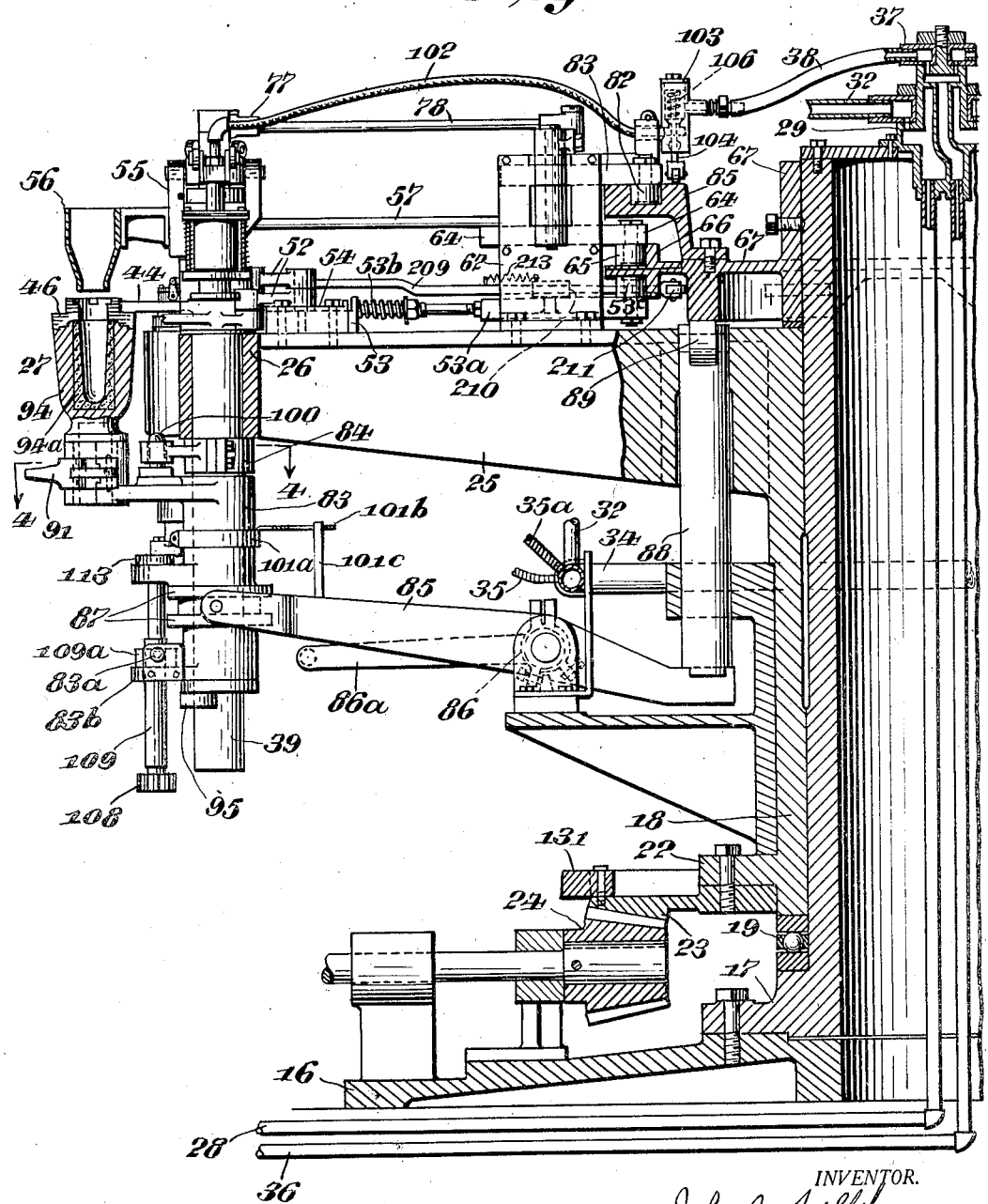

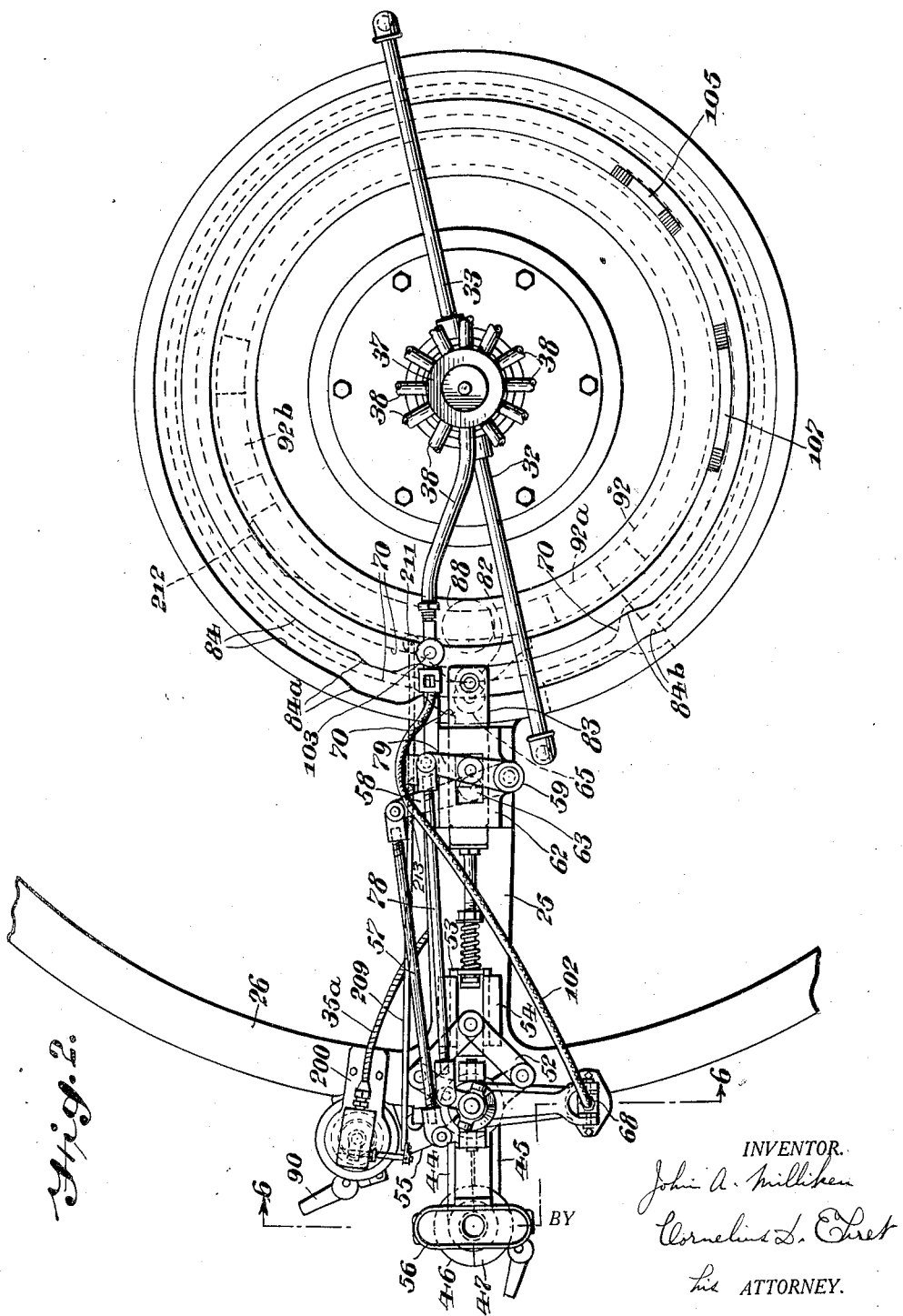

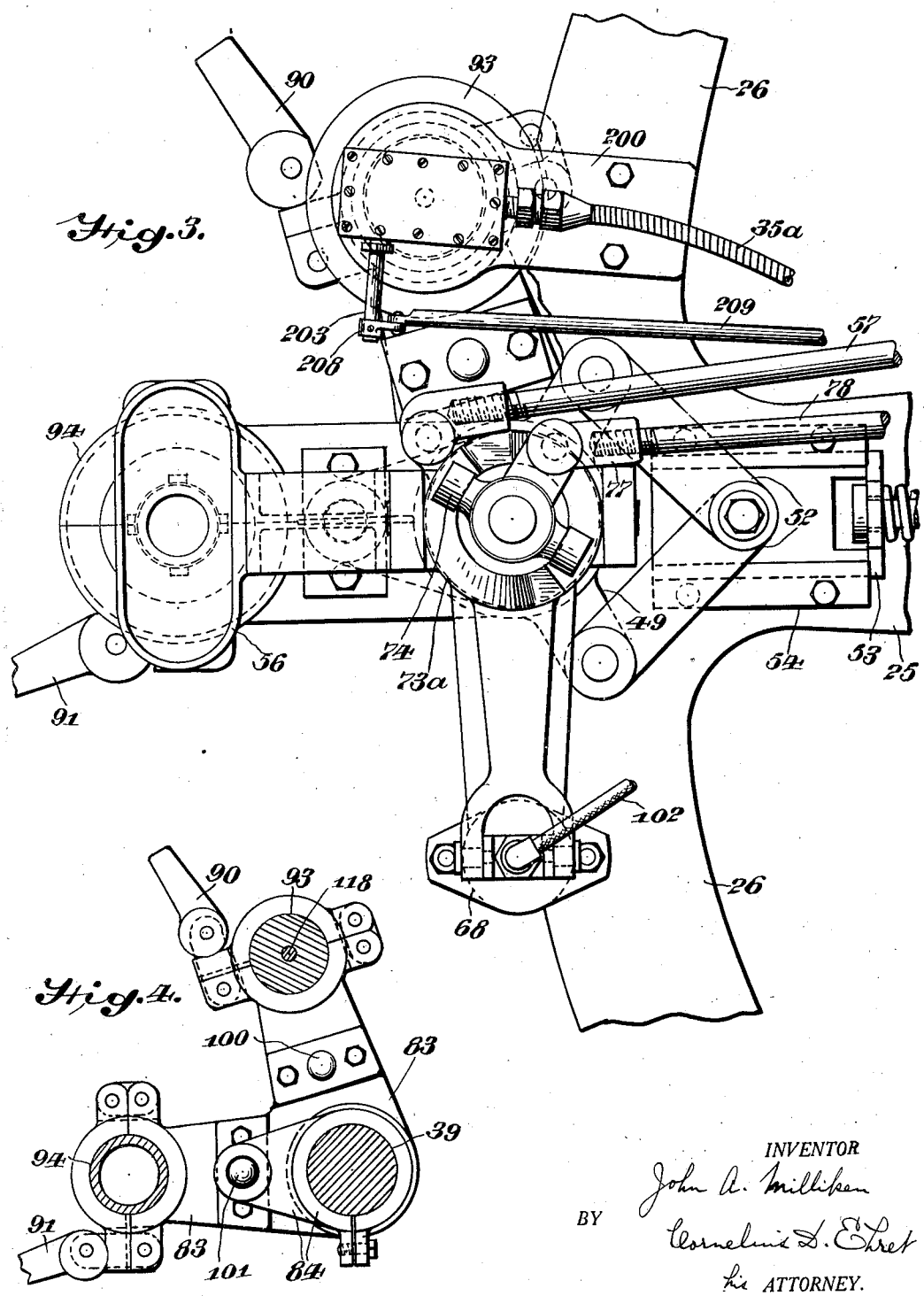

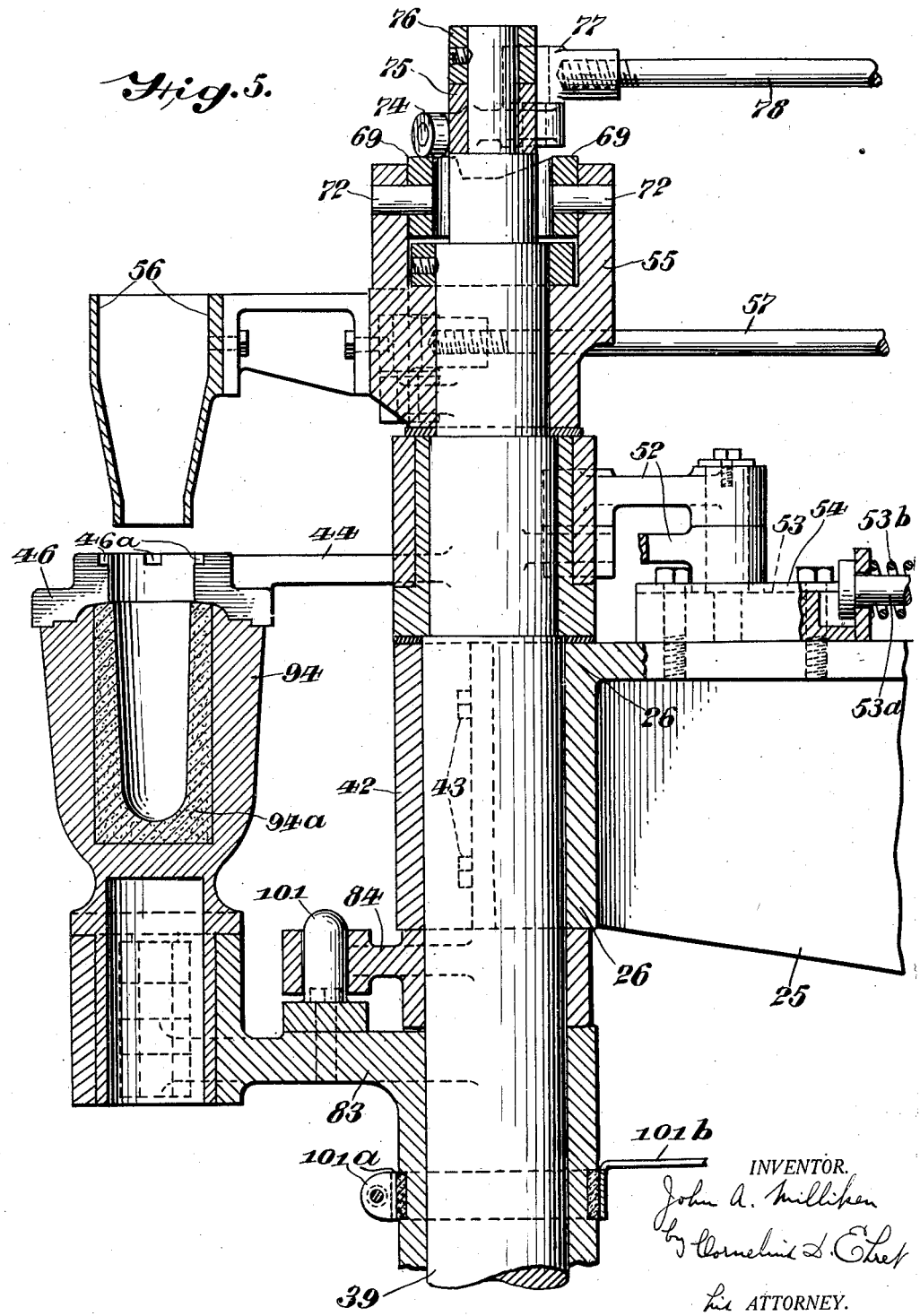

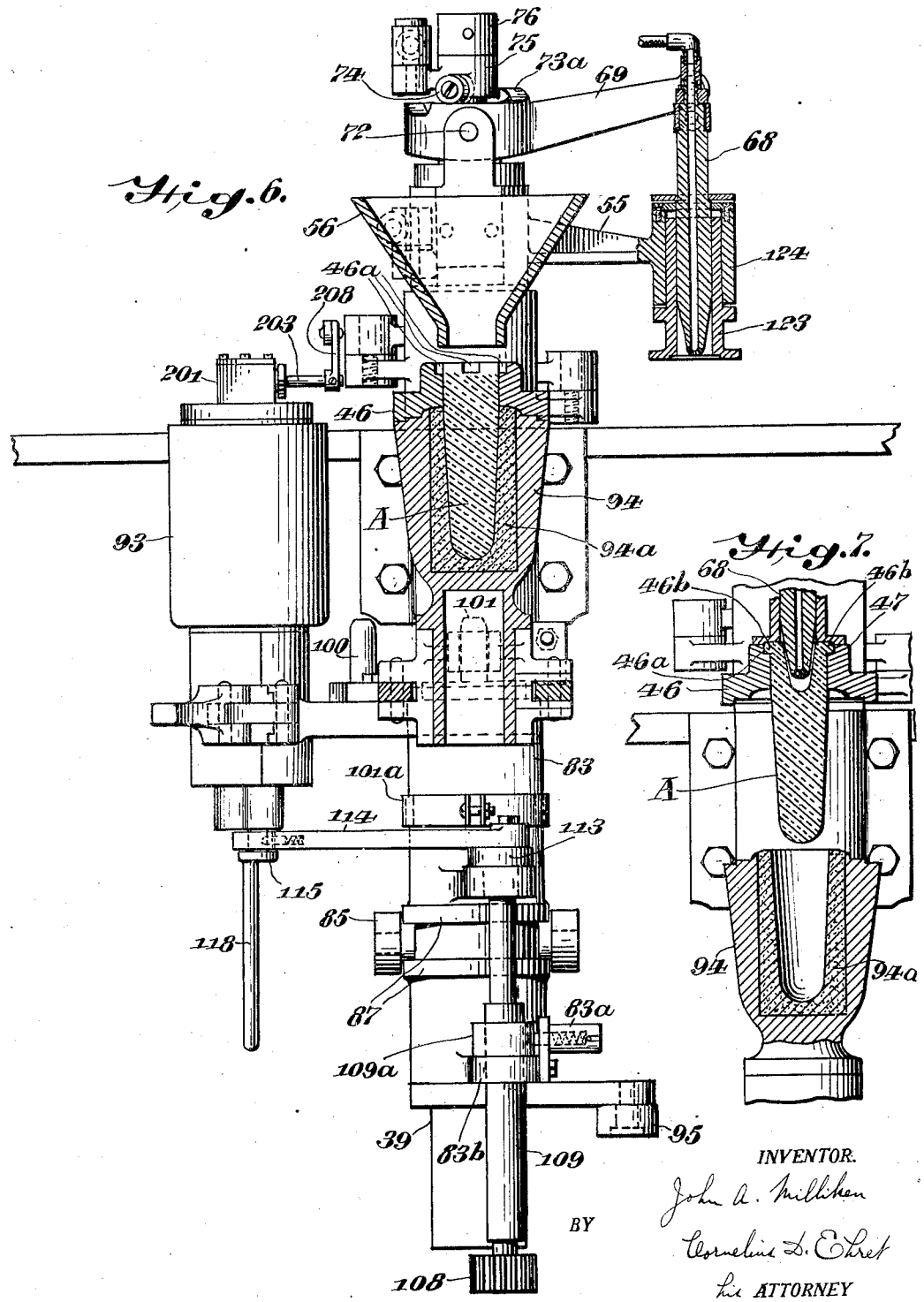

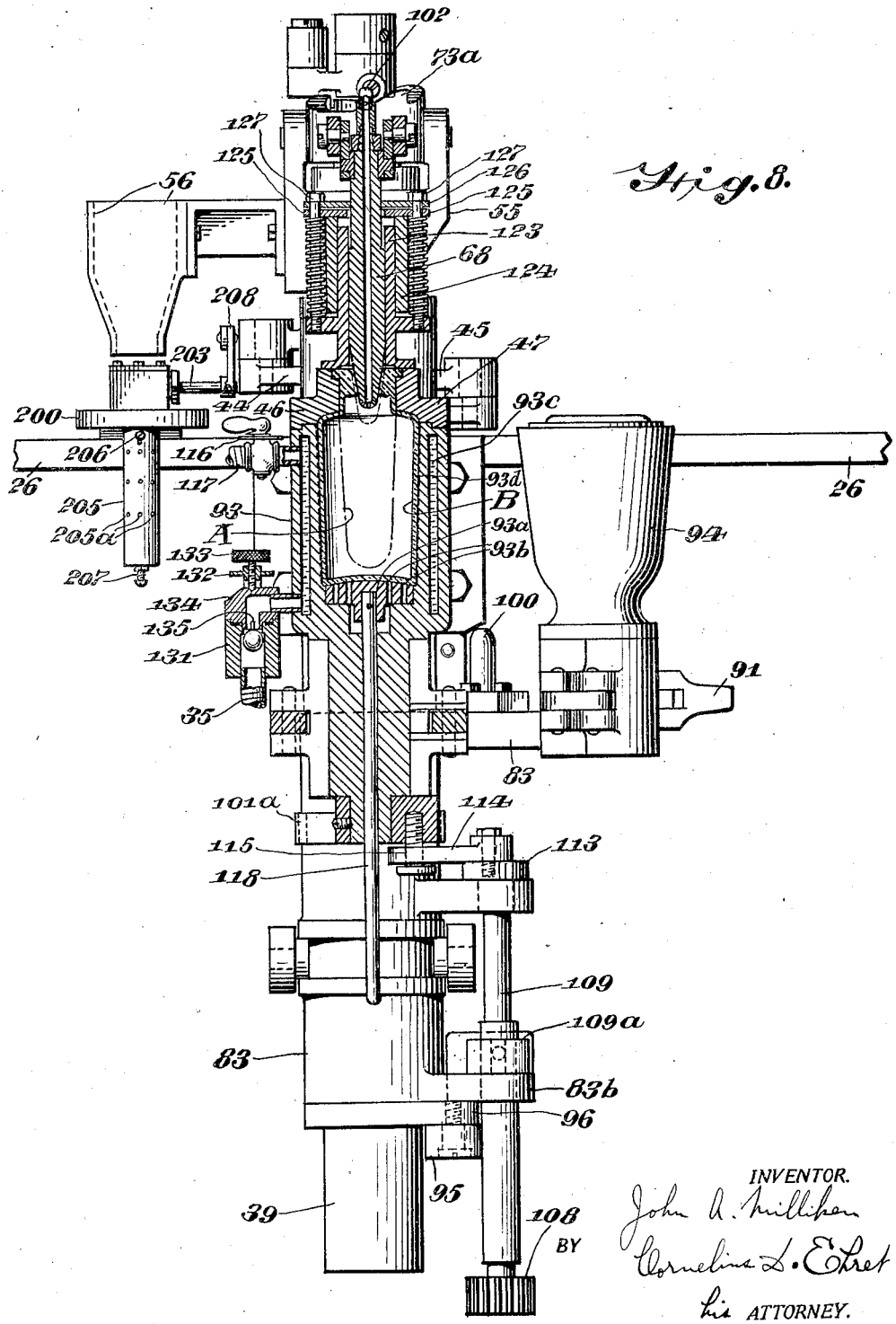

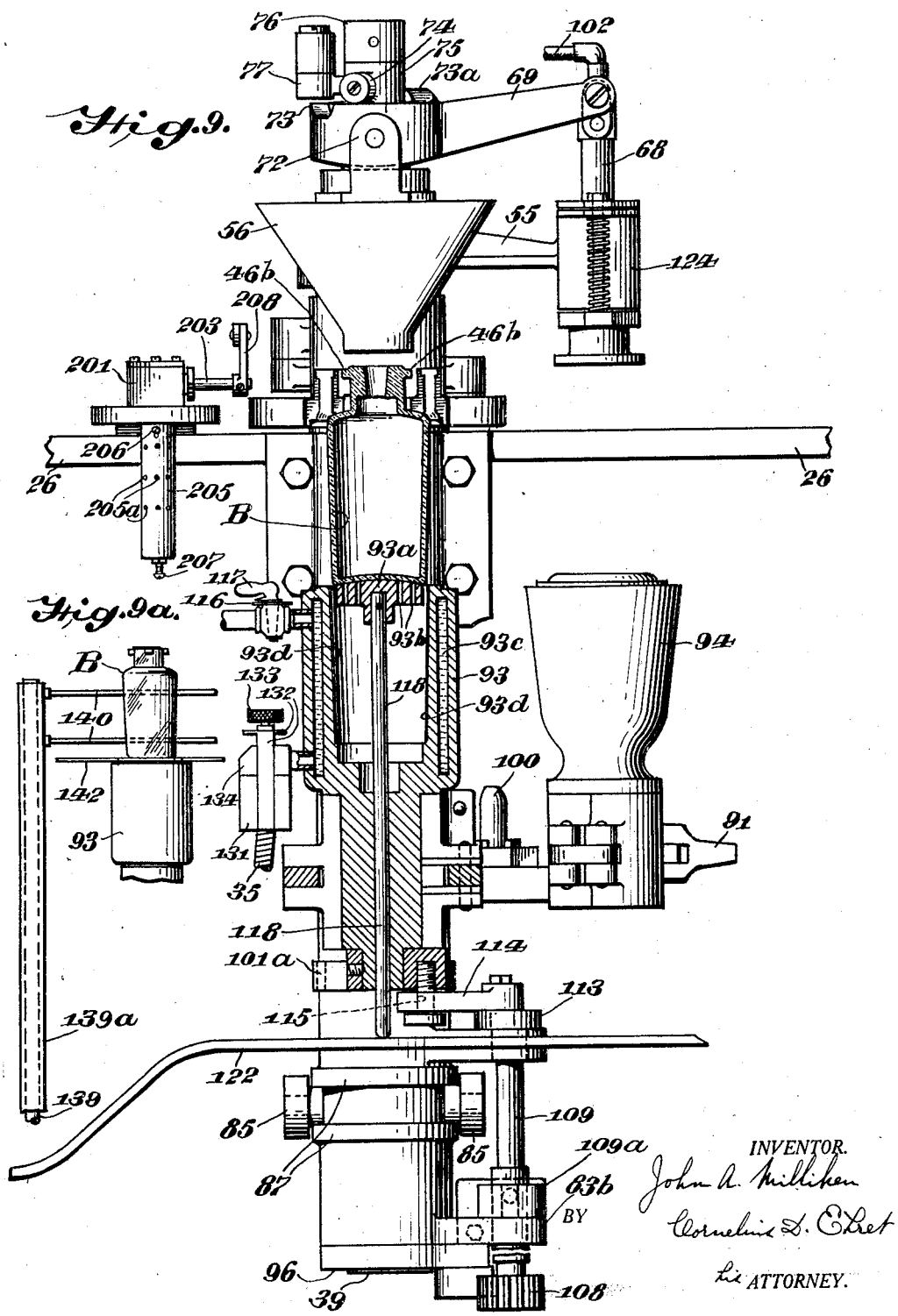

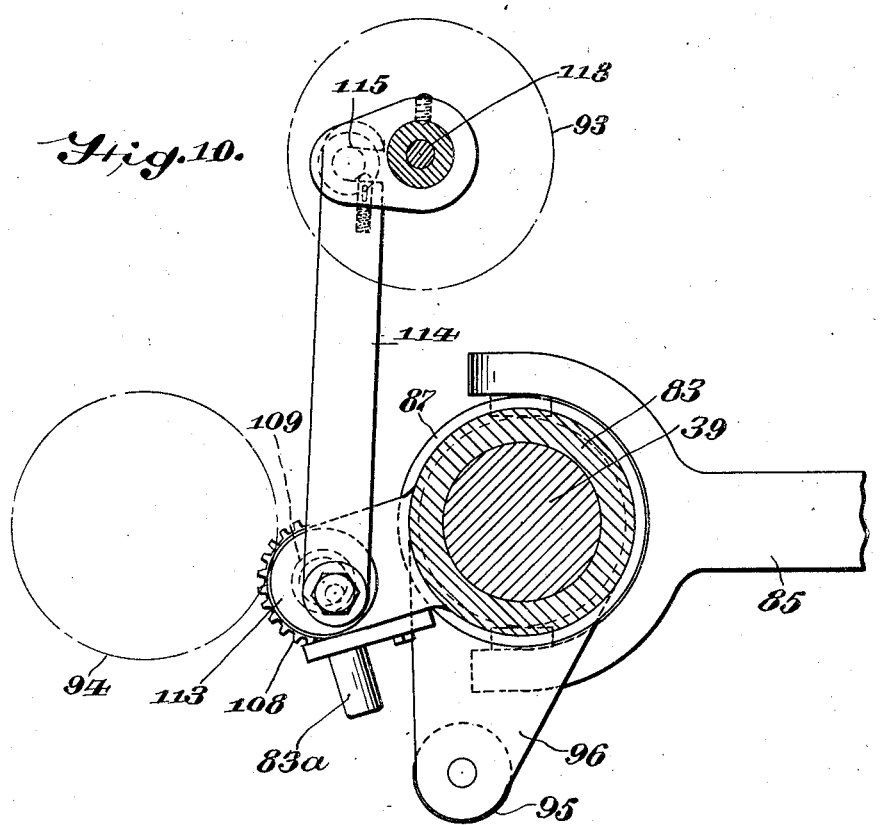
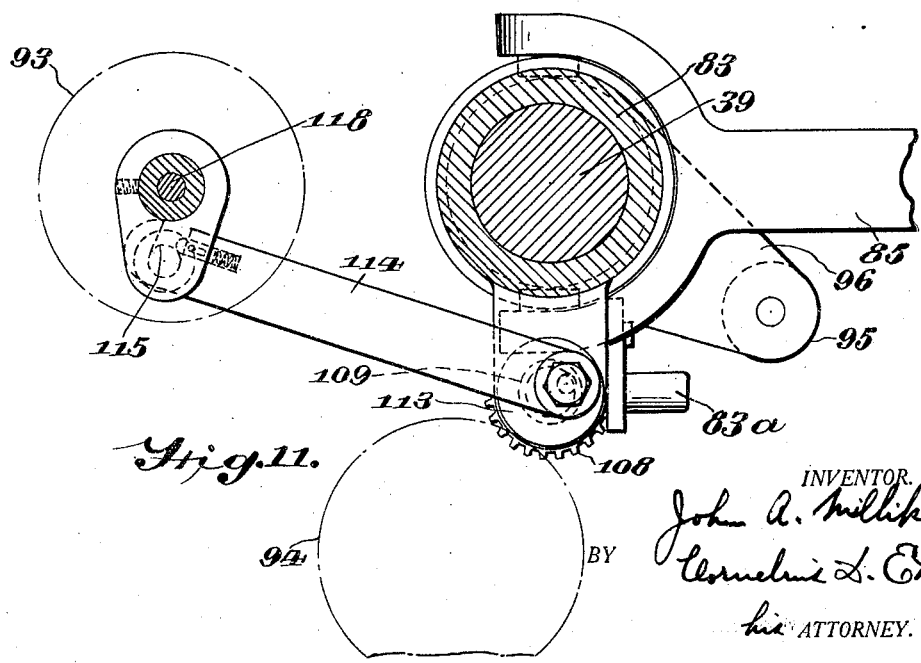

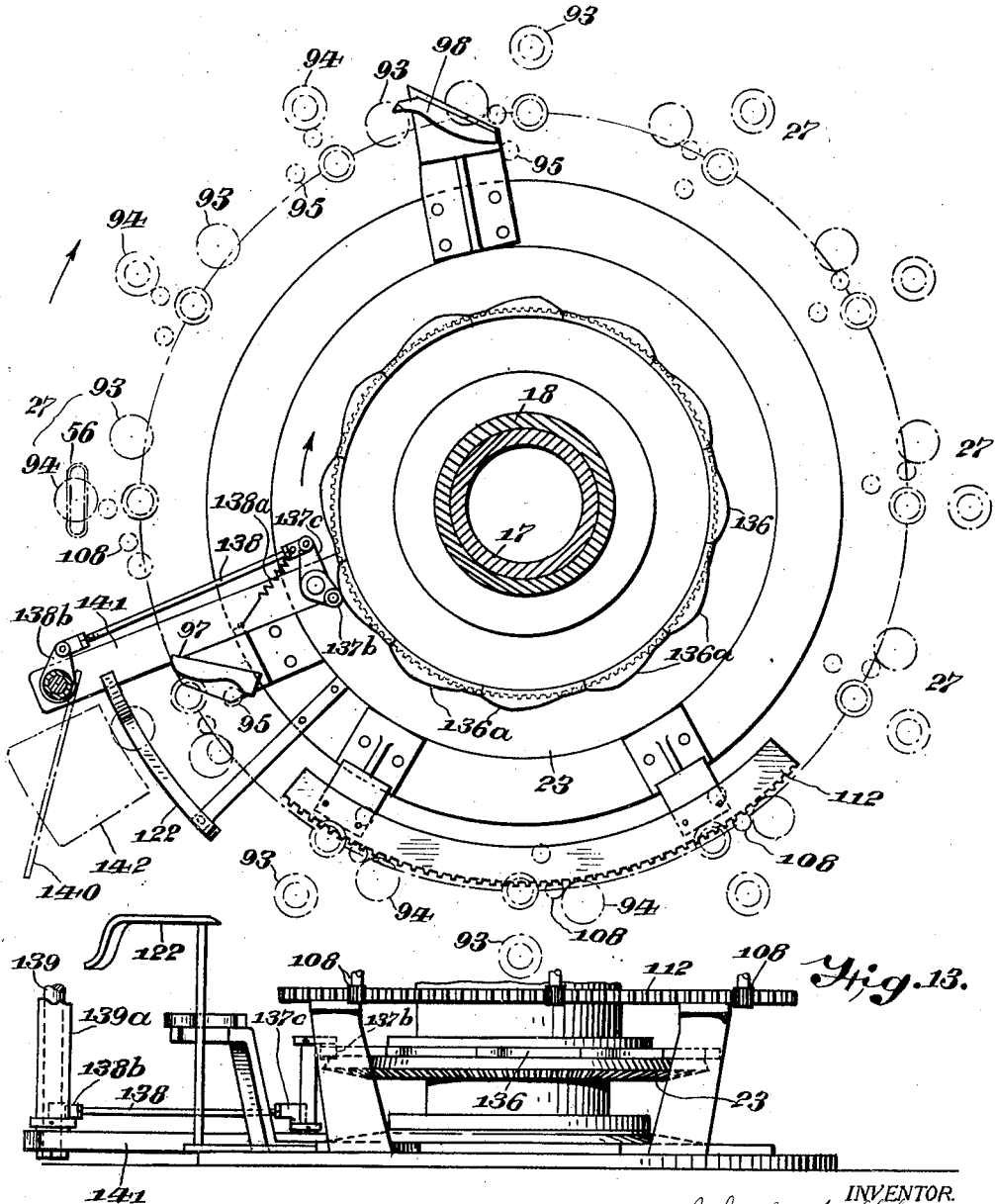

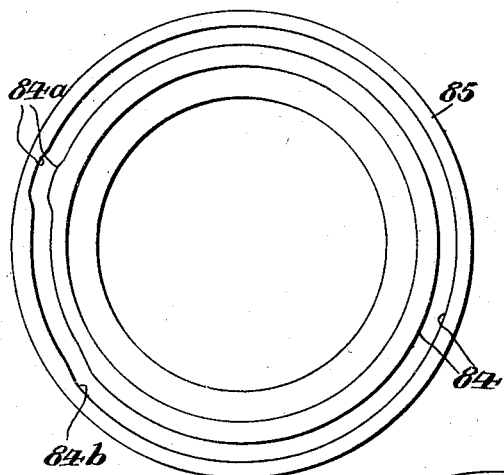
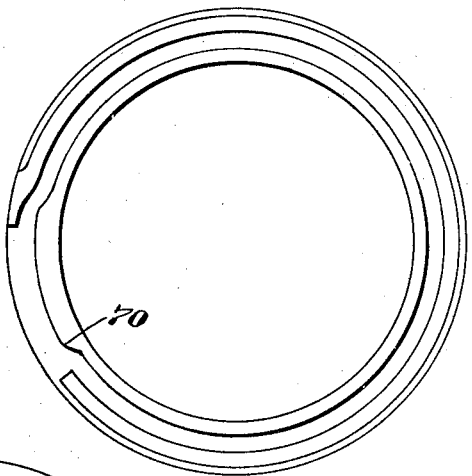
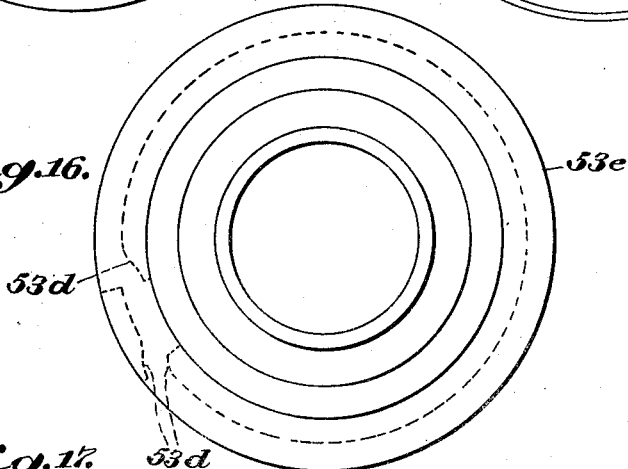
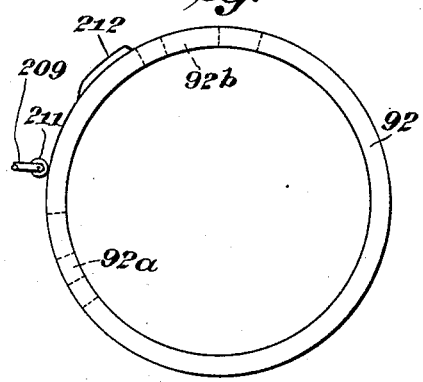
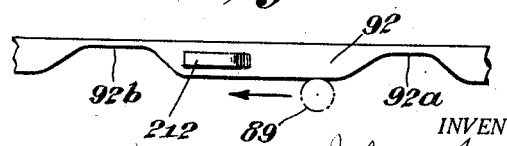

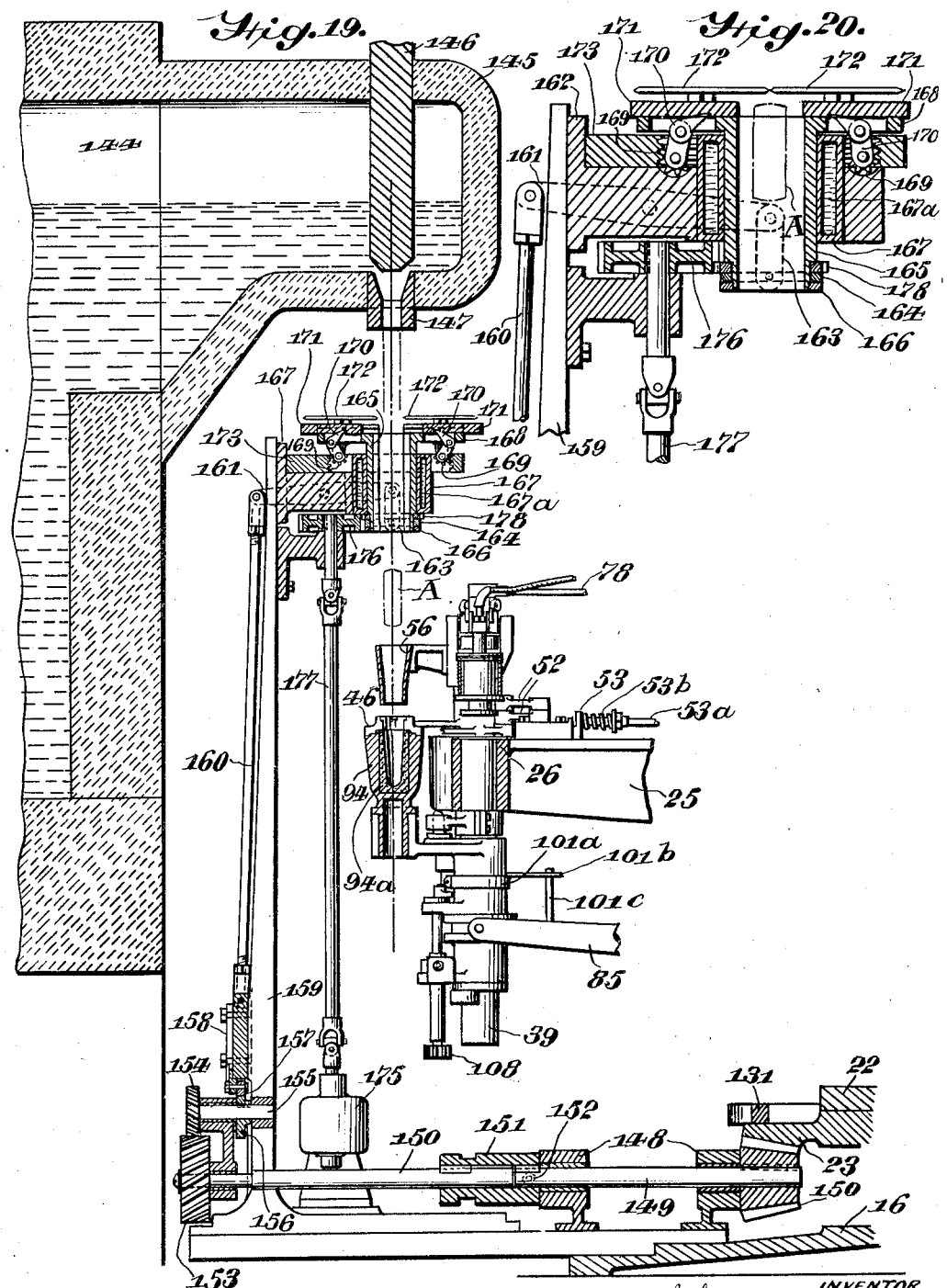

Patented Dec. 31, 1929

1,741,708

UNITED STATES PATENT OFFICE

JOHN A. MILLIKEN, OF AMBLER, PENNSYLVANIA, ASSIGNOR TO JOHN E. MARSDEN, OF PHILADELPHIA, PENNSYLVANIA

APPARATUS FOR BLOWING GLASS

Application filed November 13, 1922. Serial No. 600,516.

My invention relates to methods of and apparatus for blowing glass, and particularly to means for automatically effecting the various steps in forming a glass article from a molten batch.

One of the objects of my invention is to provide a simplified and improved method of and mechanism for automatically effecting the steps which are necessary in the process of blowing glass articles.

Another object resides in the provision—both severally and collectively—of means for delivering measured quantities of molten glass to a blowing machine in timed relation to certain movements of said machine; means for effecting engagement between slugs of molten glass and a supporting device by forming an extension on the slug; means whereby the blow-pipe may be held in operative position with respect to a slug, from its initial formation by pressing until completion by blowing, including the period of transfer of the slug from the press mold to the blow mold; means for bringing said slug and a blow mold into operative relation; means for moving a blow-pipe into operative position with respect to the glass; means for effecting relative movement between the mold and the article while being blown; means for withdrawing the blow-pipe and the blow mold from the blown article; means for cooling the molds without interruption of movement by the machine; means for removing the blown article; means for automatically effecting various steps in the formation of glass articles in definite sequence, and means for automatically operating a plurality of blowing units in definite timed relation to one another and to a supply of slugs of molten glass. My invention is not limited to these particular features nor to any particular combinations thereof, the principal features being thus mentioned in order that the invention may be more readily understood upon reading the specification.

I also provide an improved form of mold which consists of a body member having a glass-engaging surface of refractory material and low heat conductivity.

Further, I provide a blow mold of a material that is substantially free from carbon and one that is relativly non-porous at blowing temperatures, whereby discoloration of the glass is prevented and there is no tendency of the glass to adhere to the mold.

One embodiment of my invention is shown in the accompanying drawing, wherein—

Fig. 1 is a view, partially in elevation and partially in section, of a portion of a glass-blowing machine embodying my invention.

Fig. 2 is a plan view of a portion of such a machine.

Fig. 3 is a plan view of a portion of the apparatus of Fig. 2, on an enlarged scale.

Fig. 4 is a view taken on the line 4—4 of Fig. 1.

Fig. 5 is a sectional view of a portion of the apparatus shown in Fig. 1, on an enlarged scale.

Fig. 6 is a sectional view of a portion of the apparatus taken on the line 6—6 of Fig. 2.

Fig. 7 is a sectional view of a portion of the apparatus of Fig. 6, with the blow pipe in blowing position and the blow mold withdrawn from the position shown in Fig. 6.

Fig. 8 is a view, partially in elevation and partially in section, of the apparatus of Fig. 6, with the blow pipe and the blow mold both in operative position.

Fig. 9 is a view showing the positions occupied by various portions of the mechanism just at the completion of the glass article and prior to its removal from the machine. Fig. 9ª shows certain portions of the take-off mechanism for removing a completed article.

Fig. 10 is a view taken on the line 10—10 of Fig. 1.

Fig. 11 shows the apparatus on Fig. 10 with certain of the parts thereof in another position.

Fig. 12 is a view of the machine, partially in plan and partially in section, showing the various glass blowing units diagrammatically.

Fig. 13 is a view of a portion of the apparatus of Fig. 12, in side elevation.

Fig. 14 is a plan view of the cam ring employed for raising and lowering the blow-pipes when they are in position above the molds.

Fig. 15 is a plan view of the cam ring employed for swinging the blow-pipes into and out of position above the molds.

Fig. 16 is a plan view of the cam ring employed for opening and closing the jaws for engaging the neck of a glass article being formed.

Fig. 17 is a plan view of the cam ring employed for raising and lowering the molds and for controlling a spray device.

Fig. 18 is a projected view of a portion of the device of Fig. 17.

Fig. 19 is a view, partially in side elevation and partially in section, of the apparatus for feeding molten glass to the machine in measured quantities.

Fig. 20 is a view, on an enlarged scale, of a portion of the apparatus of Fig. 19, but with certain of the parts in other positions.

Fig. 21 is a view, partially in side elevation and partially in section, of a spray device for the blow molds.

Fig. 22 is a section taken on the line 22—22 of Fig. 21.

Fig. 23 is an enlarged detail view of a portion of the apparatus of Fig. 21.

The machine comprises a base 16 to which is secured an upstanding column 17. A table 18 is provided with a supporting sleeve 1 which surrounds the column 17 and rests upon antifriction bearings 19.

The supporting sleeve of table 18 is provided with a flange 22 to which a beveled gear 23 is secured, driven by a bevel pinion 24 that is connected to any suitable source of motive power.

The table 18 is also provided with radially extending arms 25, the outer ends of which are connected by an annular rib 26 (Figs. 1 and 2).

A glass blowing unit 27 is mounted at the outer end of each arm 25, there being 12 of these units, disposed as shown in Fig. 12. A water-supply pipe 28 extends upwardly through the column 17, to a hydraulic swivel 29 from which pipes 32 and 33 (Fig. 2) lead to a header 34, (Fig. 1), into which are tapped twelve pipes 35 (one for each blowing unit) that lead to the various blow molds, and twelve pipes 35ª that lead to spraying devices for the blow molds, to be hereinafter described. The header 34 is rigidly secured to the table 18.

An air supply pipe 36 also extends through the column 17 and the hydraulic swivel 29 to a header 37 that is mounted at the top of the column 17. Twelve pipes 38 are connected to the header 37, one pipe being provided for each of the blowing units. These pipes 38 are moved with the table during its rotation about the column 17, this being possible by reason of the swiveled mounting of the header 37 upon the swivel 29. As shown more clearly in (Fig. 5) a shaft 39 is carried at the outer end of each of the arms 25. This shaft is tightly clamped to the member 26 of the table 18, by a split collar 42 and screws 43. Above the arms 25 a pair of clamping or supporting members 44 and 45 (Figs. 2 and 5) are supported by the shaft for rotative movement about the shaft. These clamping members are provided with jaw portions 46 and 47 respectively, and have rearwardly disposed extensions 48 and 49 respectively (Fig. 3). A pair of links 52 are pivotally connected to a block 53 that is slidably supported in guides 54. As the block 53 is slid outwardly the jaws of the gripping members 44 and 45 are brought together to form an annular support for the neck of a glass article. The jaws 46 and 47 are provided with recesses 46ª as shown in Figs. 5 and 6. Molten glass is forced into the recesses to form lugs by means of which the article may be conveniently and securely held during the blowing in this machine and later in the chuck of a machine for decorating or cutting the article after it has been blown.

The block 53 has lost motion connection to a bar 53ª, a spring 53ᵇ serving to normally take up such lost motion but providing a yielding connection between the jaws 46—47 and the bar 53ª, to relieve strains to the mechanism as a result of material getting caught between opposing faces of the jaws. The bar 53ª carries a roller 53ᶜ that cooperates with the cam surfaces 53ᵈ of a ring 53ᵉ (Figs. 1, 2 and 16).

Above the members 44 and 45 a blow pipe carrier 55 is pivotally mounted upon the shaft 39. The carrier 55 also supports a funnel 56 (Figs. 5 and 6), the blow pipe and the hopper being movable as a unit about the shaft 39 as an axis.

A rod 57 is connected to the carrier 55 as shown more clearly in Figs. 3 and 5. This rod, at its inner end, is connected to a lever 58 that is pivotally supported at 59 upon a bracket 62 (Figs. 1 and 2). The lever 58 is provided with a pin 63 to which a slide-bar 64 is connected (Fig. 1), the slide-bar 64 being provided with a roller 65 that co-operates with cam surfaces 70 (Figs. 2 and 15) formed upon a flange member 66 (Fig. 1) which is carried by a sleeve-like member 67 that is rigidly secured to the column 17. The roller 65 (Fig. 2) moves along the cam surfaces 70 as the table is rotated. As the roller 65 moves along the cam surfaces 70, the rod 57 is reciprocated to swing the blow pipe carrier 55 about its axis.

A combined blow pipe and plunger 68 (Fig. 9) is supported by the carrier 55 and is movable vertically thereof. The vertical movement of the blow pipe is effected through an arm 69 that is pivotally mounted upon the upper end of the blow pipe carrier 55 (Figs. 5, 6 and 9), in trunnions 72.

The upper portion of the arm 69 is provided with cam surfaces 73 and 73ª upon which roll anti-friction members 74. The rollers 74 are carried by a sleeve 75 that is supported at the upper end of the shaft 39 (Fig. 5).

The sleeve 75 is provided with an arm 77 to which a rod 78 is secured. The inner end of the rod 78 (Fig. 2) is connected to a lever 79. The lever 79 is in turn pivotally secured to the bracket 62. A roller 82 is connected to the lever 79 through a bar 83 (Fig. 1). The roller 82 is carried around a cam slot 84 (Figs. 2 and 14) which is formed in a flange member 85 (Fig. 1) that is secured to the sleeve 67, the rod 78 will be reciprocated thus causing the rollers 74 to move along the cam surfaces 73—73ª and oscillating the arm 69 on its trunnions 72. This oscillation effects a vertically reciprocal movement of the blow pipe plunger 68 with respect to its carrier 55.

Beneath each of the arms 25 I provide a mold carrier 83 that is rotatable on the shaft 39 and slidable longitudinally thereof. The carrier 83 is normally held in its uppermost position against a split collar 84 that is tightly clamped to the shaft 39, by a lever 85 which is pivoted intermediate its ends, in an eccentric bushing 86. The outer end of the lever 85 is forked and has pins that engage flanges 87 of the carrier 83 and permit it to rotate with respect to the lever 85. The inner end of the lever is engaged by a bar 88 that is slidably supported by the table 18 and carries at its upper end a roller 89. The roller 89 abuts against the under side of a camming rib 92 that projects from the under side of the member 67, and is provided with reduced portions 92ª and 92ᵇ (Figs. 2 and 18). The weight upon the outer end of the lever 85 tends to bias it to move in a counter clockwise direction about the pivot 86, as viewed in Fig. 1, such movement being controlled, however, by the cam rib 92, which determines the height to which the bar 88 may rise.

The mold carrier 83 supports a blow mold 93, (here shown as a paste mold having a lining 93ᵈ as hereinafter explained—Figs. 9 and 12), and a press mold 94, and is provided at its lower end with a roller 95 (Fig. 6). Two stop members 97 and 98 (Fig. 12) are supported from the base of the machine in position to be engaged by the roller 95. Fig. 12 shows the position occupied by the roller 95 before encountering the stop member 97 and after it has passed such stop. The engagement of the roller 95 with the stop 97 swings the mold carrier 83 in a clock-wise direction to move the press mold 94 into operative position, as shown in Figs. 1 and 2. When the cam 98 is reached, it will be engaged by roller 95, thus swinging the mold carrier 83 in a counter clock-wise direction and withdrawing the press mold and moving the blow mold 93 into operative position. As shown in Fig. 4, the press mold and the blow mold are detachably secured to the mold carrier 83 by clamps 90 and 91, respectively.

The blow mold is provided with a bottom 93ª that is relatively movable along the interior surface of the body of the mold, to the position shown in Fig. 9, to effect stripping of a blown glass article B from the mold. Openings 93ᵇ are provided through the said bottom portion to permit exit of air therethrough while an article is being blown, to permit cooling fluid to drain therethrough and to provide communication between opposite sides of said bottom so that its movements will not be retarded by air compression or suction. A chamber 93ᶜ is provided in the walls of the mold 93 to permit circulation of water therethrough which will be hereinafter described.

The press mold 94 is provided with a lining 94ª of a refractory material such as carbon, that is of low heat conductivity. This is for the purpose of preventing chilling of the slug of glass when brought against the wall of the mold, thus avoiding the presence of "laps" or "seams" in the finished article. Such irregularities occur as a result of shreds or protruding portions of glass becoming chilled and then imbedded in the body of molten glass being worked.

The eccentric bushing 86 shown in Fig. 1 is provided with a handle 86ª by means of which the bushing may be turned within its support, to raise or lower the outer end of the lever 85, independently of the bar 88. Lowering the lever allows the mold carrier to move downwardly so that the flanges on the upper ends of the molds will clear the shoulders on the underside of the clamps 46—47 to permit ready removal of the molds for replacement or repairs.

Referring now more particularly to Figs. 2, 8 and 21, I mount a spray device 200 upon the annular rib 26 of the mold table. As will appear in Figs. 1 and 3, this spray device is mounted in such position that the blow mold 93 is in vertical alinement therewith when the press mold 94 is in operative position. There are twelve of these spray devices—one for each blowing unit—and the water is supplied thereto through the pipes 35ª that are in communication with the header 34.

As will appear more clearly in Fig. 21 the device comprises a chambered block 201 with which the pipe 35ª has communication. A valve disc 202 is pivotally mounted upon a pin 203 within the block 201. Into the opening beneath the valve disc 202 I thread a perforated cylindrical member 204. A sleeve 205 surrounds the member 204 and has pin-and-slot engagement therewith as shown at 206. The sleeve 205 has perforations 205ª which register with perforations 204ª in the cylinder 204, and also has perforations 205ᵇ in the lower end thereof, through which water may drain. A stop member 207 is secured to the lower end of the sleeve 205 by means of which the sleeve may be moved upwardly to bring its perforations into registry with the perforations of the cylinder 204, or into partial registry therewith, to control the amount of flow therethrough.

A crank 208 is secured to each of the pins 203 and one end of the link 209. The links 209 are each slidably supported by brackets 210 (Figs. 1 and 2) that are secured to the ribs 25 of the mold table and each of which is provided, at its inner end, with a roller 211 that engages the outer face of a rib 92 which is secured to the upstanding column 17. The rib 92 (Figs. 2 and 17) is provided with a camming lug 212. A spring 213 normally biases the link 209 inwardly and holds the roller in engagement with the rib 92.

It will be seen that as the mold table moves about the column 17 the roller 211 will be carried along the camming rib 92 and be forced a slight distance outwardly whenever it meets the lug 212. This outward movement operates to turn the crank 208 to raise the valve disc 202 to the position shown in dotted lines in Fig. 21, thus admitting water to the cylinder 204. The water, however, is confined in such cylinder until the sleeve 205 has been raised by movement on the blow mold 93 into position therebeneath to engage the stop member 207. When this operation has been effected liquid is sprayed through the perforations against the interior of the mold 93 to cool the same.

Assuming the table 18 to be rotating under the action of the pinion 24, the funnel 56 and press mold 94 being in the positions shown in Figs. 5 and 6, a slug A of molten glass is dropped into the hopper and passes down into the press mold 94. The table has meantime reached a position where the rod 57 is actuated by its cam roller 65 to rotate the blow pipe carrier 55 so that the funnel 56 will be swung out of position above the press mold 94 and the blow pipe plunger 68 be moved into position thereabove. At this time one of the rollers 74 will be rotated to carry it up the cam surface 73ª to force the blow pipe plunger 68 to a position slightly below that shown in Fig. 7. This movement of the blow pipe causes the molten glass to be forced into the recesses that are formed in the jaw members 46 and 47. This forms a neck for the glass article by means of which it is supported by the clamping or supporting members independently of the press mold 94. As soon as this operation has taken place the table has reached a point where the rod 78 is actuated, by reason of the cam roller 82 passing between the portions 84ª of the cam ring 84 (Figs. 2 and 14) to rotate the sleeve 75 and carry one of the rollers 74 into engagement with the cam surface 73, which is on that side of the pivot diametrically opposite the blow pipe, thus causing the arm 69 to move about its trunnions 72 and temporarily raise the blow pipe a slight distance, to the position shown in Fig. 7. This prevents chilling of the glass surrounding the end of the pipe, while the blow mold is being swung into operative position.

While the press mold is in operative position and the slug of glass is being pressed therein and into engagement with the clamping members, a blow mold 93 occupies the position shown in Fig. 6 and 21 and its associated roller 211 is passing over the camming lug 212, thus admitting fluid through the valve 202 and the perforations 204ª and 205ª as above described. The spraying operation continues until the roller has passed the lug 212 and the press mold and blow mold have been moved downwardly as will be hereinafter described. These movements cause the valve 202 to be then closed and the perforations in the members 204 and 205 moved out of registry. The sleeve member 205 is provided so that it may serve as a valve to prevent flow of water through the perforations in the member 204 after the valve 202 has been closed and the blow mold moved away.

When the molten glass has been pressed into engagement with the jaws 46 and 47 and the blow pipe 68 slightly withdrawn therefrom, the roller 89 of the bar 88 has reached the reduced portion 92ᵇ of the camming member 92, thus permitting such bar to rise and allowing the mold carrier 83 to move downward carrying the press mold 94 out of engagement with the molten glass. At this time the roller 95 has reached the cam member 98 (Fig. 12) and the mold carrier 83 is turned to the position shown in Fig. 8. As soon as the mold carrier has reached this position, the roller 89 passes from the reduced portion 92ᵇ of the cam ring 92 and encounters a downwardly depending portion thereof, thus causing the outer end of the lever 85 to be moved upwardly and carrying the blow mold 93 into the position in Fig. 8. Air is then admitted to the blow pipe from the header 37, through the pipe 38 and a flexible tube 102, by the opening of a valve 103, which is controlled by a plunger 104. The plunger 104 carries a roller at its lower end which, when the operations above described have been effected, has reached a rib 105 on the flange 85 (Figs. 1 and 2). The time occupied by the table in passing this rib permits sufficient air to be admitted for the initial blowing. When the valve 103 and its roller have passed the rib 105 and the air is again shut off by reason of the spring 106 which tends to close the valve. The blowing unit then encounters a rib 107 that will cause another opening movement of the valve 103 and admit sufficient air to complete the blowing of the article B located within the blow mold 93.

The mold carrier 83 is provided with studs 100 and 101 (Figs. 5 and 6) that respectively enter a hole in the collar 84, when either the press mold or the blow mold is in operative position, to center the molds in position. The stud 101 is in alignment with the hole when the press mold is in the position shown in Fig. 5, and the stud 100 occupies such position when the blow mold is in operative position.

As shown in Figs. 1, 5 and 6, I provide a friction band 101ᵃ that embraces the mold carrier 83 and is provided with a slotted extension 101ᵇ through which extends a post 101ᶜ that is carried by the lever 85. This band serves as a brake to prevent slamming of the mold carrier when it is oscillated about the shaft 39.

When the blowing unit has encountered rib 105, a pinion 108 that is carried upon the lower end of a shaft 109 encounters an arcuate rack 112 that is secured to the base of the machine. The shaft 109 is provided at its upper end with an eccentric 113 (Figs. 8, 10 and 11). A connecting rod 114, has its opposite ends joined to the eccentric 113 and to a stud 115 on the lower side of the blow mold 93. The movement of the pinion 108 along the rack 112 rotates the eccentric 113, thus causing oscillatory motion of the mold 93, by reason of the connections just referred to, to give a smoothing and polishing effect to the glass B within the blow mold. This oscillation continues until shortly before the blowing unit has reached the cam member 97 (Fig. 12).

In order to prevent idle oscillation of the blow mold 93 when the pinion 108 is not being actuated by the arcuate rack 112, I provide a yielding stop member 83ᵃ, Fig. 6, that is carried on an extension 83ᵇ of the mold carrier 83, comprising a spring-pressed pin that has a rounded head biased into engagement with a hole in a collar 109ᵃ which is secured to the shaft 109. The hole and the pin are in registry when the blow mold is in the position shown in Fig. 9, at which time the pinion 108 has just left the rack 112.

While the blowing of the glass article is taking place water is admitted through the pipes 28, 32 and 33, header 34, and pipe 35, to chamber 93ᶜ of the blow mold to cool the same, the water flowing through the chamber of the mold and to an outlet valve 117, as will be apparent from Figs. 8 and 9.

The outlet valve 117 is provided with a dial 116 and a pointer. By this valve the flow of water from the mold 93 may be regulated, to keep such mold at a desired temperature, the dial 116 and the pointer serving to indicate the position of the valve. A ball valve is provided at the inlet 35 and consists of a lower member 131 having a yoke 132 through which a thumb screw 133 is threaded to hold it in engagement with a coupling member 134 for the ball. When the parts are in assembled position, a centrally disposed lug 135, carried by the member 134, holds the ball off its seat and permits water to flow through the valve. Upon disassembling the valve and coupling member 134, the ball will seat, thus preventing a flow of water through the pipe 35. This arrangement permits of the convenient replacement of blow molds without stopping the machine and without shutting off the flow of water at its source.

When the roller 82 reaches the point 84ᵇ (Figs. 2 and 14) of the cam ring 85, the rod 78 is drawn inwardly, causing one of the rollers 74 to ride up the cam surface 73 and withdraw the blow pipe 68 from the neck of the glass article B and also carrying the bushing 123 out of engagement with the neck of said article, by reason of the shouldered portion of the blow pipe 68 (Fig. 8) coming into engagement with a plate 126, thereby raising bolts 127 to which the bushing 123 is secured. At this time the roller 65 Figs. 1, 2 and 15, passes along the cam surface 70, pushing the rod 57 outward and thus swing the blow-pipe carrier 55 about its axis, to carry the blow-pipe away from, and the hopper 56 into, operative position.

In order to prevent leakage of air between the blow pipe 68 and its carrier 55, a flanged bushing 123 is provided (Fig. 8) that slides in a cylindrical portion 124 of the carrier 55. A pair of springs 125 normally bias the bushing 123 downward. When the blow pipe is lowered this tension holds the bushing 123 tightly in engagement with the upper surfaces of the clamping or supporting members 46 and 47. When the pressing operation has taken place the roller 82 has passed the portion 84ᵃ of the cam ring 84 (Fig. 2) and maintains the rollers 74 in the position shown in Fig. 8, the blow pipe being in the position of Fig. 8. The cam surface 73ᵃ then lies beneath one of the rollers 74 and the blow pipe 68 is thereby held in the position shown in Fig. 8 and the flanged bushing 123 held in close engagement with the gripping members 46 and 47.

Just before the blowing unit has reached the cam 97 as above explained, a plunger 118 (Figs. 6, 8 and 9) reaches a point directly above a shelf 122 (Figs. 12 and 13). At this time the roller 89 of the plunger 88 encounters the reduced portion 92ᵃ of the cam ring 92, permitting the outer end of the lever to be moved down by the weight of the mold carrier 83, but the rod 118 can not move down owing to its abutting engagement with the shelf 122. This results in the blow mold 93 being stripped clear of the glass article B as shown in Fig. 9. The roller 53ᶜ (Fig. 1) for operating the clamping and supporting jaws has been reached a point where it will be actuated by its passage through the camming surfaces 53ᵈ to release the neck of the blown article and permit its removal from the machine. The shelf 122 is inclined at its forward end so that the plunger 118 will be held against a sudden fall upon passing off the shelf.

In Figs. 9ª, 12 and 13, I show a form of take-off device for removing the glass article when the blow-pipe has been removed and the blow-mold 93 withdrawn to the position shown in Fig. 9. A cam ring 136 is secured to the rotatable column or mold table 18 and is provided with twelve camming lugs 136ª, one for each mold unit. These lugs co-operate with a roller 137ᵇ that is carried by a lever 137ᶜ which is pivotally mounted upon the base of the machine and is connected to a link 138. A spring 138ª biases the roller 137ᵇ into engagement with the cam ring 136, so that the passage of the lugs 136ª along the roller 137ᵇ will cause an oscillation of the link 138.

The link 138 is connected to a crank 138ᵇ which is secured to a sleeve-like shaft 139ª that is supported by an upstanding post 139 which is carried on an extended base member 141. The sleeve 139ª carries fingers 140 at its upper end and rotative movement is imparted thereto by the reciprocation of the link 138.

At the instant that one of the blow molds 93 has been stripped from the glass article as shown in Fig. 9, one of the camming lugs 136ª is passing the roller 137ᵇ thus causing the fingers 140 to be swung into engagement with the blown article to slide it from the blowing unit to a table or carrier, the article having been previously released as explained above. When the lug 136ª has passed the roller 137ᵇ, the spring 138ª causes the sleeve 139ª and its fingers 140 to be retracted so that the fingers will be in position to engage another completed article, upon the arrival of the next mold unit.

Upon passing the take-off station, the roller 95 of the mold carrier 83 engages the cam member 97 causing the mold carrier to be swung about the shaft 39, to bring the press mold 94 into position beneath the hopper 56 which was swung into operative position upon withdrawal of the blow pipe as above explained. Meantime, the jaw members 46 and 47 have been again closed by reason of their actuating roller 53ᶜ (Fig. 1) having passed the camming surfaces 53ᵈ (Fig. 16). The roller 89 (Fig. 1) has then passed the depression 92ª (Fig. 18) causing the outer end of the bar 85 to be raised and the press mold 84 moved upwardly into engagement with the gripping members 46 and 47; ready to receive another slug of glass.

In Figs. 19 and 20, I have shown apparatus by means of which slugs of molten glass may be supplied to the blowing units. A molten batch of glass is contained in a tank 144 that is provided with a forehearth 145 into which a plug 146 extends, the plug being movable toward and away from an orifice 147 to regulate the flow of glass therethrough.

Bearings 148 are secured to the base of the machine, to support a shaft 149 that is driven by a bevel gear wheel 150 which meshes with the gear wheel 23 that is secured to the rotatable table 18. A second shaft 150 has a sleeve 151 secured thereto, the sleeve having splined connection to the shaft 149. A set screw 152 extends through the sleeve 151 so that the sleeve and the shaft 149 may be adjustably secured in relatively fixed longitudinal positions.

A wide-faced pinion 153 is secured to the outer end of the shaft 150 and meshes with a gear wheel 154 that is secured to a shaft 155, both of the gear members having spirally cut teeth. The shaft 155 has an eccentric 156 which is carried by a block 158 that is slidably supported by frame work 159. A rod 160 connects the block 158 to a pair of levers 161 (only one of which is shown). Rotation of the mold table 18 effects rotation of the shaft 155, through the connections just described, while rotation of the shaft causes the eccentric 156 to impart vertical movement of the rod 160, such rod returning to its lowermost position by the action of gravity, when the eccentric 156 has returned to the position shown.

The levers 161 are pivotally mounted at opposite sides of a block and each has a link 163 depending therefrom. The links 163 are connected to collar 164 that loosely surrounds a sleeve member 165 whose interior is unobstructed, to permit free passage therethrough of the slugs of glass. A collar 166 is secured to the sleeve to hold the collar 164 in place thereon.

The sleeve 165 is supported within bearing block 167 that is provided with a chamber 167ª through which a cooling fluid may circulate. A flange 168 that is formed upon the upper end of the sleeve has depending lugs which support a pair of pinions 169 that have bell cranks 170 secured thereto. The flange 168 is also provided with radially disposed guideways in which blocks 171 may slide.

Each of the blocks 171 supports a rotatable disc or cutter 172 whose axis is vertical, and is provided with a recess into which the upper end of the bell crank 170 extends, so that the blocks will be slid inwardly whenever the upper ends of cranks 170 are moved toward the axis of the sleeve 165.

An annular block 173 that has circumferentially disposed rack teeth upon its inner surface is secured to the block 162, so that as the sleeve 165 is raised and lowered the pinions 169, and the cranks 170 carried thereby, will be oscillated.

A motor 175 is mounted upon the base of the machine and drives a wide-faced pinion 176, through a shaft 177 that has universal joints to prevent binding of the shaft in its bearings. The pinion 176 drives a gear wheel 178 that is secured to the sleeve 165, thus rotating the sleeve and the parts carried thereby.

Starting with the parts in the position shown in Fig. 19 and with a stream of molten glass flowing from the tank, upward movement of the rod 160 will cause the sleeve 165 to move downward, rocking the bell cranks 170 inwardly and sliding the blocks 171 inwardly also, thus bringing the discs 172 into engagement with the stream of glass. The discs 172 move downwardly with the sleeve and the sleeve is being constantly rotated by the motor 175. The discs thus have two movements—one with the stream of glass and the other about the axis of the sleeve, spirally toward such axis. The wide face of the pinion 176 permits of moving the sleeve vertically without breaking the driving connection with the gear wheel 178.

When the parts have reached the positions shown in Fig. 20, a slug of glass has been severed from the stream of molten glass and permitted to fall into the hopper 56. The ends of cranks 170 have passed out of engagement with the groove of the blocks 171 and the rod 160 is permitted, by the eccentric 156, to move downwardly, carrying the sleeve to the position shown in Fig. 19. The centrifugal force imparted to the blocks 171, through rotation of the sleeve 165, causes them to move to retracted position, ready for another operation. The blocks 171 have sufficient vertical play in their guide ways to permit the ends of the arms 170 to again move into place in the grooves when the sleeve is returned to the position of Fig. 19.

By providing the proper gear reduction between the gear wheels 23 and 150, the cutting-off mechanism just described may be moved through twelve cycles during each revolution of the mold table, thus severing twelve slugs of glass—one for each mold unit. The transmission mechanism may also be so adjusted that a slug of glass will be delivered to the hopper 56 at the instant such hopper and one of the press molds 94 reach their operative positions.

By running the cutting-off mechanism at a uniform speed the slugs of glass will be of uniform length and adjustment of the plug 146 will regulate the cross-sectional area of the slugs.

The means which I have provided for severing slugs of glass and delivering them to the machine permit of withdrawing the glass from the tank at lower temperatures than with other forms of feeding devices, thus having the glass of such consistency that the slugs may be more readily cut to uniform size, delivering the glass to the molds at more desirable blowing temperatures, and tending to prevent excessive heating of the molds.

Furthermore the bodily movement of the discs 172 about the longitudinal axis of the stream of glass, combined with their movement towards a common point on such axis, effects a severance of slugs without shreds or tailings that become chilled before settling on the slug. Such shreds would appear in the finished article as "overlaps" or "seams".

The molds in which the glass is blown may be of the paste type, i. e. having a coating 93$^d$ (Fig. 21) of linseed oil, bees wax and cork, and then baked, or may be of a non-corrosive, close grained metal that is free from carbon, such as Monel metal. These latter molds will not discolor the glass and the glass will not adhere to them as blowing temperatures, and it is not necessary to quench them.

What I claim as my invention is:—

1. In a glass blowing apparatus, a rotatable table, a press mold and a blow mold supported by said table and movable as a unit relative to said table, means for supporting a slug of glass, means for moving said molds parallel with the longitudinal axis of a slug of glass supported by said gripping means, means for moving said molds at right angles to the longitudinal axis of said slug so as to alternately position them opposite said slug of glass, and means for disengaging the glass article from said supporting means upon completion of the blowing operation.

2. A glass blowing apparatus comprising a rotatable table, a mold supported by said table, a blow pipe also supported by said table, means independent of the mold and also sustained by said table for supporting a slug of glass beneath said blow pipe, and means operated by rotation of said table for moving the mold vertically so as to strip it from the completed article previously formed therein.

3. A glass-blowing machine comprising a rotatable table, a press mold and a blow mold carried thereby, means for directing a slug of glass into the press mold, a blow pipe, gripping members located above the press mold, means for expanding the molten glass into engagement with the gripping members, means operated by rotation of said table for withdrawing the press mold from the molten glass by a movement parallel with the longitudinal axis of said slug of glass, and simultaneously imparting a movement to said blow mold in the same direction, means operating in timed sequence with the press-mold-withdrawing means for moving the blow mold into position beneath said slug of glass, a blow pipe, means for moving the blow pipe into operative position with respect to the said molten glass, and means operated by rotation of said table for oscillating the blow mold about its axis while the glass is being blown.

4. A glass blowing machine comprising a rotatable table, a press mold and a blow mold supported thereby so as to move in unison both vertically and horizontally, gripping members supported above the plane of horizontal movement of said molds, means for expanding a portion of a slug of molten glass into engagement with said gripping members, means operated by rotation of said table for imparting vertical movements to said molds relative to said gripping members, means for imparting horizontal movements to said molds while at the limit of their movement away from said gripping means so as to selectively position the molds beneath said gripping means, and means also operated by rotation of said table for disengaging the completed glass article from said gripping members.

5. A glass blowing machine comprising a molten-glass-slug-gripping device, a press mold and a blow mold movable in unison, said press mold normally occupying a position beneath said gripping device, a blow pipe, means for moving said blow pipe laterally to a position above said gripping device, means for imparting longitudinal movement to said blow pipe while in such position, so as to cause it to enter the adjacent end of a glass slug engaged by said gripping device and expand said glass into interlocking engagement with said gripping device, means for withdrawing the press mold from its normal position, means for subsequently moving the blow mold into position to receive said slug and to engage it with said blow pipe, and means for supplying air through said blow pipe to expand said glass slug within the mold.

6. A glass blowing machine comprising a molten glass-slug-gripping device, a press mold and a blow mold movable in unison, said press mold normally occupying a position beneath said gripping device, a blow pipe, means for moving said blow pipe laterally to a position above said gripping device, means for imparting longitudinal movement to said blow pipe while in such position, so as to cause it to enter the adjacent end of a glass slug engaged by said gripping device and expand said glass into interlocking engagement with said gripping device, means for withdrawing the press mold from its normal position, means for subsequently moving the blow mold into position to receive said slug and to engage it with said blow pipe, means for supplying air through said blow pipe to expand said glass slug within the mold, an eccentric, means operated by said eccentric for oscillating said blow mold, and means for periodically operating said eccentric.

7. A glass blowing machine comprising a molten glass slug gripping device formed of two relatively movable members, a press mold and a blow mold movable in unison, said press mold normally occupying a position beneath said gripping device, a blow pipe, means for moving said blow pipe laterally to a position above said gripping device, means for imparting longitudinal movement to said blow pipe while in such position so as to cause it to enter the adjacent end of a glass slug engaged by said gripping device, means for withdrawing the press mold from its normal position, means for subsequently moving the blow mold into position to receive said slug and to engage it with said blow pipe, a rotatable member provided with means for oscillating said blow mold, means for periodically operating said rotatable member, and means for temporarily separating the members of the gripping device to release the glass article upon withdrawal of said blow mold.

8. A glass-blowing machine comprising a blow pipe, means for imparting vertical movement thereto to permits its being moved into and out of engagement with a slug of glass, a press mold for receiving a slug of molten glass in preparation for a blowing operation, a blow mold into which the slug of glass is blown and means for imparting horizontal movements to the said molds, and means for also imparting vertical movements to said molds, said movements of the molds being in predetermined sequence so that they will be moved into and out of engagement with the molten glass during the process of its formation into a glass article.

9. A glass blowing machine comprising a base member, a table rotatably supported by said base member, a glass-slug-gripping device, a press mold, a blow mold, said molds being supported so as to move in unison, means for moving said molds in directions parallel with the longitudinal axis of a glass slug supported by said gripping device, cam means carried by the table for actuating said mold-moving means, means for moving said molds laterally with respect to said glass slug, and cam means rigid with respect to said base for actuating the last mentioned mold moving means, the respective cam means being so arranged that the different movements of the molds are automatically effected in definite sequence during rotation of said table.

10. A glass blowing machine comprising a base member, a table rotatably supported by said base member, a glass-slug-gripping device, a press mold, a blow mold, said molds being supported so as to move in unison, means for moving said molds in directions parallel with the longitudinal axis of a glass slug supported by said gripping device, cam means carried by the table for actuating said mold-moving means, means for moving said molds laterally with respect to said glass slug, cam means rigid with respect to said base for actuating the last mentioned mold moving means, the respective cam means being so arranged that the different movements of the molds are automatically effected in definite sequence during rotation of said table, means for oscillating said blow mold, an operating shaft for said oscillating means, and means by which rotation of said table imparts rotations to said shaft.

11. A glass blowing machine comprising a base member, a table rotatably supported by said base member, a glass slug gripping device formed of a pair of separately mounted members, a press mold, a blow mold, said molds being supported so as to move in unison, means for moving said molds in directions parallel with the longitudinal axis of a glass slug supported by said gripping device, cam means carried by the table for actuating said mold moving means, means for moving said molds laterally with respect to said glass slug, cam means rigid with respect to said base for actuating the last mentioned mold moving means, the respective cam means being so arranged that the different movements of the molds are automatically effected in definite sequence during rotation of said table, a rotatable shaft provided with means for oscillating the blow mold, means by which rotation of said table periodically operates said shaft, and means for supporting said gripping members to release the completed glass article held thereby.

12. A glass-blowing machine comprising a rotatable table provided with a glass blowing unit that comprises vertically reciprocal and rotatable press and blow molds, gripping members for holding a slug of molten glass, a blow pipe that is vertically and horizontally movable, cam surfaces disposed circumferentially of the base, and operating members for the movable members of the blowing unit that are engaged by the cam surfaces in proper sequence during the rotation of the table to effect necessary movements of the said glass blowing unit.

13. The combination with a movable table, of a glass-blowing unit comprising a mold carrier, a press mold and a blow mold carried by said carrier, means for directing a slug of molten glass into the press mold, a gripping member, normally located above the press mold, means for expanding the said molten glass into engagement with the gripping member, means for imparting simultaneous horizontal movements to said molds so that they may be positioned opposite to said gripping member, and means for imparting simultaneous longitudinal movements to the molds so that either of them may be engaged with and withdrawn from said slug by successive vertical and horizontal movements while said slug is held stationary, and means for moving a blow pipe into operative position with respect to the said slug of glass, said operating means all being actuated by members disposed along the path of travel of the table.

14. A glass-blowing machine provided with a press mold and a blow mold movable as a unit, a gripping member normally disposed above the press mold, means for directing a slug of glass into the press mold, means for expanding it into engagement with the gripping member, means for removing the press mold, means for moving a blow mold vertically into operative position with respect to the glass slug, and a blow pipe for expanding the slug of glass into the mold.

15. A glass blowing machine provided with a press mold, a gripping member normally disposed above the press mold, means for directing a slug of glass into the press mold, means for expanding the glass into engagement with the gripping member, means for removing the press mold, a blow mold, means for moving the blow mold horizontally into operative position with respect to the glass slug, a blow pipe for expanding the slug of glass into the blow mold, means for removing the blow mold downwardly from a completed glass article, and means for releasing the article from the gripping member after the mold has been removed therefrom.

16. A glass blowing machine provided with a blow mold, means for forming a glass article therein, an arm connected to said mold so as to impart oscillations thereto, and means for operating said arm.

17. In a glass blowing apparatus, a rotatable table, a blow mold mounted on said table and movable therewith, means for forming a glass article in said mold, an arm connected with said mold so as to impart successive reciprocable rotative movements to the mold while the article is being blown, and means by which said arm is operated during rotative travel of said table.

18. In a glass blowing apparatus, a shaft, a mold movably supported by said shaft, a sleeve separate from said mold and also supported by said shaft, means for holding one end of said sleeve in engagement with a contiguous end of said mold, a blowpipe movably mounted within and guided by said sleeve, and having one end positioned to engage the glass to form a neck therein, and means cooperating with said shaft and acting upon the other end of the blowpipe to withdraw the first mentioned end a slight distance.

19. In a glass blowing apparatus, a rotatable table, a blowpipe supported by said table and capable of vertical and horizontal movements independently of said table, and cam means operated by rotation of the table for imparting horizontal movement to said blowpipe, and cam means also operated by rotation of said table for imparting said vertical movement to said blowpipe.

20. In a glass blowing machine, the combination with a rotatably mounted table having a plurality of support shafts about its periphery, a blowing unit on each shaft, each unit consisting of a blow pipe capable of horizontal and vertical movements with respect to said shaft, a glass slug gripping device, and a press mold and a blow mold, said molds being capable of simultaneous vertical and horizontal relative movements with respect to said shaft, means for supplying a molten glass slug to said gripping device, stationary cams, means operated by said cams during movement of the table for rotating said molds on said shaft first in one direction and then in the reverse direction, an arm for raising and lowering said molds, means for operating said arm during rotation of said table, an arm operated during rotation of the table for moving said blow pipe horizontally, and means to admit air to said blow pipe, the various cams and other operating means being so positioned with respect to the orbit of travel of the blowing units as to effect the several operations in a definite sequence.

21. A glass-blowing machine comprising a rotatable table, a plurality of mold units disposed circumferentially thereof and each comprising a blow-pipe, holding members, a press mold and a blow mold, a receiving station at which slugs of molten glass are delivered to the mold units as they are moved past said station, means for delivering a slug of glass into each press mold, means for moving the blow-pipe into engagement with said slug to perform a pressing operation thereon and expand it into engagement with said holding members, means for moving said molds toward and from said slug, and means for moving said molds laterally so that the press mold may be withdrawn and a blow mold moved into operative position, means for admitting air through the blow pipe to expand the said slug within the blow mold, means for oscillating the blow mold while the glass is being expanded, and means for disengaging the blow mold from the said glass.

22. A glass-blowing machine comprising a rotatable table, a plurality of mold units disposed circumferentially thereof and each comprising a sleeve and a blow pipe guided thereby holding members, a press mold and a blow mold, a receiving station at which slugs of molten glass are delivered to the mold units as they are moved past said station, a pivotally mounted arm engaging one end of said blow pipe, and means engaging said arm to rock the same, so that the blow pipe will first engage a slug to expand it into engagement with said holding members and then withdraw it a slight distance.

23. The combination with a blow-pipe, of a press mold and a blow mold that are mounted for movement vertically as a unit with respect to the blow-pipe.

24. The combination with a blow-pipe, of a press mold and a blow mold mounted for simultaneous movement with respect to the blow-pipe, in vertical and horizontal planes.

25. The combination with a blow-pipe, of a mold carrier located adjacent to said pipe, a pair of molds supported by the carrier, means for moving the carrier toward and away from the blow-pipe, and means for imparting rotative movement to the carrier when in its retracted position, to bring the respective molds successively into alinement with said blow-pipe so that the molds are caused to successively act upon the same blank.

26. The combination with a glass-blowing apparatus provided with a rotatable mold table and a plurality of mold units carried by said table, each unit comprising a blow-pipe and a press mold and a blow mold movable relative to said pipe, of means controlled by movement of said table to move each of said molds vertically into operative position with respect to the blow-pipe, during one revolution of the table.

27. A glass-blowing machine provided with a rotatable table, a blow pipe movable with the table, a pair of molds, means for moving said molds about a vertical axis to bring them selectively into position opposite the blow pipe, and means for moving them in a direction parallel to said axis.

28. In a glass blowing apparatus, a rotatable mold table, mold units pivotally mounted on said table, each mold unit consisting of a press mold and a blow mold, and a blow pipe above said molds in a normally fixed position with respect to said table, means at one position along the path of travel of said mold units during travel of said table for moving each unit about its pivot in one direction, means located at another position for moving each unit in the other direction, so as to alternately position said molds opposite to said blow pipe, and means for moving the respective units in a direction parallel with the axis of rotation of said table after each pivotal movement, so that the positioned mold is brought into cooperative relation with respect to the blow pipe of its unit.

29. In a glass blowing apparatus, a rotatable mold table, mold units pivotally mounted on said table, each mold unit consisting of a press mold, a blow mold and a blow pipe above said molds in a normally fixed position with respect to said table, means at one position along the path of travel of said mold units during rotation of said table for moving each pair of molds about their pivot in one direction, and means located at another position for moving the molds in the opposite direction, so that the molds are alternately brought into position opposite to the blow pipe of their unit, means for moving the molds so as to bring the positioned mold into cooperative relation with respect to said blow pipe and to subsequently withdraw it from said relation, and means for lifting the blow pipe to inoperative position upon withdrawal of the blow mold from operative relation with said blow pipe.

30. In a glass blowing apparatus, a rotatable mold table, mold units pivotally mounted on said table, each mold unit consisting of a press mold, a blow mold and a blow pipe above said molds in a normally stationary position with respect to said table, means at one position along the path of travel of said mold units during rotation of said table for moving each pair of molds about their pivot in one direction, means located at another position for moving the molds in the opposite direction, means for moving the molds in a direction parallel with the axis of rotation of said table after each pivotal movement of said molds, so as to bring one of the molds into cooperative relation with respect to the blow pipe and then withdraw it from said relation, and means for lifting the blow pipe to inoperative position upon withdrawal of the blow mold from operative relation with said blow pipe, and for subsequently returning the blow pipe to operative position upon movement of the press mold to a position thereunder.

31. In a glass blowing apparatus, a rotatable mold table, a plurality of blow molds carried by said table, a shaft contiguous to each mold, an eccentric on said shaft, means connecting each mold with its contiguous eccentric, and means for rotating said shafts during rotation of said table so as to impart independent oscillations to the molds.

32. In a glass blowing apparatus, a rotatable table, a plurality of blow molds carried by said table, rotatably mounted gear wheels, one for each mold, means whereby rotation of said gear wheels will effect oscillations of said molds, and a stationary rack positioned to successively engage and rotate said gear wheels during rotative travel of said table.

33. In a glass blowing apparatus, a rotatable table, a plurality of axially movable blow molds supported by said table, each mold having a bottom disconnected from the body thereof, means for blowing glass articles within the respective molds, and means for holding the bottoms of the molds stationary during axial movement of said bodies.

34. In glass blowing apparatus, a carrier, a blow pipe supported on said carrier, a blow mold also supported on said carrier and axially movable toward and from said blow pipe, said mold having a bottom disconnected from the body thereof, and means for holding the bottom of the mold stationary during axial movement of said body away from said blow pipe.

35. The combination in a glass-blowing machine provided with a carrier, of a blow pipe supported upon the carrier, a blow mold having a relatively movable bottom portion both movable vertically into operative relation to said pipe said bottom having a depending member, and means disposed adjacent to the carrier to engage said depending member for holding said bottom portion against retractive movement when the mold is withdrawn from the blow pipe.

36. In a glass blowing apparatus, the combination with a rotatable mold table provided with glass blowing units, of take-off mechanism comprising a cam member carried by said table, said cam member having a plurality of cam surfaces, one for each blowing units, an actuator lever mounted on a support normally stationary with respect to said table, means normally holding one end of said lever in engagement with said cam member, and a take-off device connected with and oscillated by said actuator lever.

37. In a glass blowing apparatus, the combination with a rotatable mold table provided with glass blowing units, of take-off mechanism comprising a cam member carried by said table and provided with a plurality of cam surfaces, one for each blowing unit, an actuator lever mounted on a support normally stationary with respect to the movement of said table, means normally holding one end of said lever in engagement with said cam member, a post mounted in spaced relation to said actuator lever, a sleeve mounted to oscillate on said post and provided with a take-off device, and connections between said sleeve and said actuator lever.

38. In a glass blowing apparatus, a paste mold, means supporting the same, a glass supporting member engaging said mold, a rotatable shaft, means connecting said shaft and said mold for oscillating said mold with respect to said supporting member during the formation of the glass article within the mold.

39. In a glass blowing machine, a movable carrier, paste molds mounted on the carrier, glass supporting members engaging the respective molds, rotatable shafts, one for each mold, mold oscillating means connecting said shafts with the respective molds, and means for successively rotating said shaft so as to oscillate each mold with respect to its glass supporting member during movement of said carrier.

40. In a glass blowing machine, a hollow column, a mold carrier rotatably mounted on said column, chambered molds supported by said carrier, a fluid supply pipe extending through said column, a header supported by said carrier and connected with said supply pipe, and means connecting said header with the chambers of the said molds.

41. In a glass blowing apparatus, a mold, a spray device, means for supplying cooling fluid thereto, means for temporarily causing the mold to enclose the spray device, and means operated in time with the relative movement of the mold and the spray device for regulating the supply of cooling fluid passing to the spray device.

42. In a glass blowing apparatus, a rotatable mold carrier, a blow mold supported thereby, a spray device, means for supplying cooling fluid to said spray device, means operated by movement of the mold carrier for causing the mold to temporarily enclose the spray device, and means also operated by movement of the mold carrier for regulating the supply of cooling fluid passing to the spray device.

43. The combination with a glass-blowing machine, of a mold table, means carried by the table for supporting a slug of molten glass, a mold, an eccentric sleeve serving as a pivotal support for the mold, means controlled by movement of the table for oscillating the mold about its pivot, into and out of engagement with respect to said support for the glass, and a manually-operable lever for imparting rotative movement to the said sleeve to move the mold out of engagement with said supporting means, whereby the mold may be removed regardless of the position of the table.

44. In a glass blowing apparatus, a mold carrier, a mold mounted thereon for horizontal and vertical movements, a spraying device located above the plane of horizontal movement of the mold, means for moving the mold in a direction to enclose said spraying device, and a valve for said spraying device positioned to be engaged and operated by the mold during its movement with respect to the spraying device.

45. In a glass blowing apparatus, a mold carrier, a mold mounted thereon, a spraying device located above the plane of horizontal movement of the mold, means for moving the mold in a direction to enclose said spraying device, and a valve member for said spraying device provided with an operating projection positioned to engage the bottom of the mold during the enclosing movement of said mold with respect to said spraying device.

46. In a glass blowing apparatus, a mold carrier, a mold provided with a movable bottom, means for forming a glass article within said mold, means controlled by movement of the carrier for imparting movement to the mold away from said forming means, and means for holding the bottom of the mold stationary during said movement of the mold so as to eject the glass article.

47. In a glass blowing apparatus, a movable mold table, a series of mold units carried by the said table, mold spraying devices carried by said table and located adjacent to the respective mold units, means operable at predetermined positions for causing each mold to enclose the contiguous spraying device, and means rendered effective by engagement of the mold with the spraying device for rendering said spraying device operative.

48. The combination with a glass blowing machine provided with a mold carrier, of a plurality of molds carried thereby, spray devices for the molds, each spray device consisting of two relatively movable members provided with complemental perforations positioned to be brought into and out of register by relative movement of said members, means actuated by movement of the carrier for moving the molds into position surrounding the orifices of the spray devices, and means for rendering the spray devices effective upon movement of the molds into operative relation thereto.

49. The combination with a mold carrier, of a mold supported thereby, a spray device consisting of two relatively movable members provided with complemental perforations positioned to be brought into and out of register by relative movement of said members, and means operable in predetermined relation to the movement of the carrier for moving the mold into position surrounding the spray device, relative movement of the members of the spray device being effected by the positioning movement of the mold.

50. In a glass blowing apparatus, a movable mold carrier, a mold supported thereby, said mold being open at one end and closed at the other, a spray device positioned contiguous to the open end of the mold, said spray device including a tubular stem, and a tubular valve member enclosing the stem, and means controlled by movement of said carrier for moving said mold to a position enclosing said spray device so that the closed end of the mold will engage and operate said valve member.

In testimony whereof I have hereunto affixed my signature this ninth day of November, 1922.

JOHN A. MILLIKEN.